United States Patent [19]

Anderson et al.

[11] 3,868,195
[45] Feb. 25, 1975

[54] COOLANT SYSTEM FOR MACHINE TOOL

[75] Inventors: Fred A. Anderson, Holden; Robert F. Newton, Worcester, both of Mass.

[73] Assignee: Cincinnati Milacron-Heald Corp., Worcester, Mass.

[22] Filed: Sept. 14, 1973

[21] Appl. No.: 397,293

[52] U.S. Cl.................. 408/61, 90/11 R, 184/6.26
[51] Int. Cl............................................. B23b 51/06
[58] Field of Search............... 408/56, 61; 90/11 R; 82/DIG. 1; 29/106; 184/6.26, 55 R

[56] References Cited
UNITED STATES PATENTS

| | | | |
|---|---|---|---|
| 2,250,349 | 7/1941 | Berquist | 408/61 |
| 3,398,609 | 8/1968 | Schott | 408/61 |
| 3,577,808 | 5/1971 | Visser | 408/61 |

*Primary Examiner*—Gil Weidenfeld
*Attorney, Agent, or Firm*—Norman S. Blodgett; Gerry A. Blodgett

[57] ABSTRACT

A machine tool having a coolant system consisting of a hollow ring from which the coolant is projected in a generally conical pattern.

3 Claims, 5 Drawing Figures

COOLANT SYSTEM FOR MACHINE TOOL

BACKGROUND OF THE INVENTION

In the operation of a machine tool it is often necessary to bathe the workpiece and the tool in coolant. As the name implies, a coolant is a fluid which serves to maintain the temperature of the tool in the workpiece at a low value, so that tool wear will be reduced below an appreciable value and so that the metallurgy of the workpiece is not changed. Other functions served by such a fluid are the removal of loose particles from the work area and as a lubricant to assist in the machining process. The coolant may take the form of liquid, mist (liquid droplets suspended in air), or air.

The usual practice in the past has been to direct the fluid toward the work area through a flexible nozzle or nozzles positioned by the machine operator or through the spindle of the machine. Even when the fluid is recirculated, as in the case of a cutting fluid, it is wasteful and messy and cannot possibly perform the function properly, particularly where tools vary considerably in length and diameter throughout a cycle, like on a numerically controlled machining center with automatic tool changer. Attempts in the past to overcome these deficiencies have resulted in apparatus which is quite expensive, which presents maintenance problems, and which obstructs the machinist's movements and necessitates positioning the nozzle for each different length size or shape of cutting tool. This can be very dangerous to the operator unless costly remote operating devices are provided. These and other difficulties experienced with the prior art devices have been obviated in a novel manner by the present invention.

It is, therefore, an outstanding object of the invention to provide a machine tool having means for applying coolant to a variety of tools without any adjustment during the machining cycle by the operator, thus avoiding the necessity of the operator making coolant adjustments in the dangerous work area.

Another object of this invention is the provision of a machine tool having a coolant system which does not interfere with the machining operations or its set-up.

A further object of the present invention is the provision of a machine tool having a coolant system which supplies coolant to all parts of the work area with equal intensity.

It is another object of the instant invention to provide a coolant system for a machine tool, which system is relatively simple and inexpensive in construction and capable of a long life of useful service with a minimum of maintenance.

A still further object of the invention is the provision of a machine tool having a coolant system which uses relatively small amounts of coolant but uses it effectively.

Another object of the invention is to provide either flood or mist coolant at present levels by tape or manual command without further attention from machine operator.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having a housing, having a spindle mounted in the housing for rotation about an axis and adapted to carry a tool, and having a coolant system mounted on the housing. The cooling system forms a generally conical pattern of streams of coolant which converge on the said axis at different levels.

More specifically, the coolant system involves a hollow ring which is concentric with the axis and is connected to a source of coolant. The hollow ring is provided with a radial wall which divides it into two axially-spaced chambers. The wall is provided with primary orifices. One chamber is provided with air under pressure, while the other chamber is provided with liquid coolant. The other chamber is also provided with secondary orifices leading to the exterior of the ring, which secondary orifices are in general alignment with the primary orifices. Air flows from the said one chamber through the primary orifices in the said wall, passes through the liquid coolant in the said other chamber and leaves in a stream through the secondary orifices.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
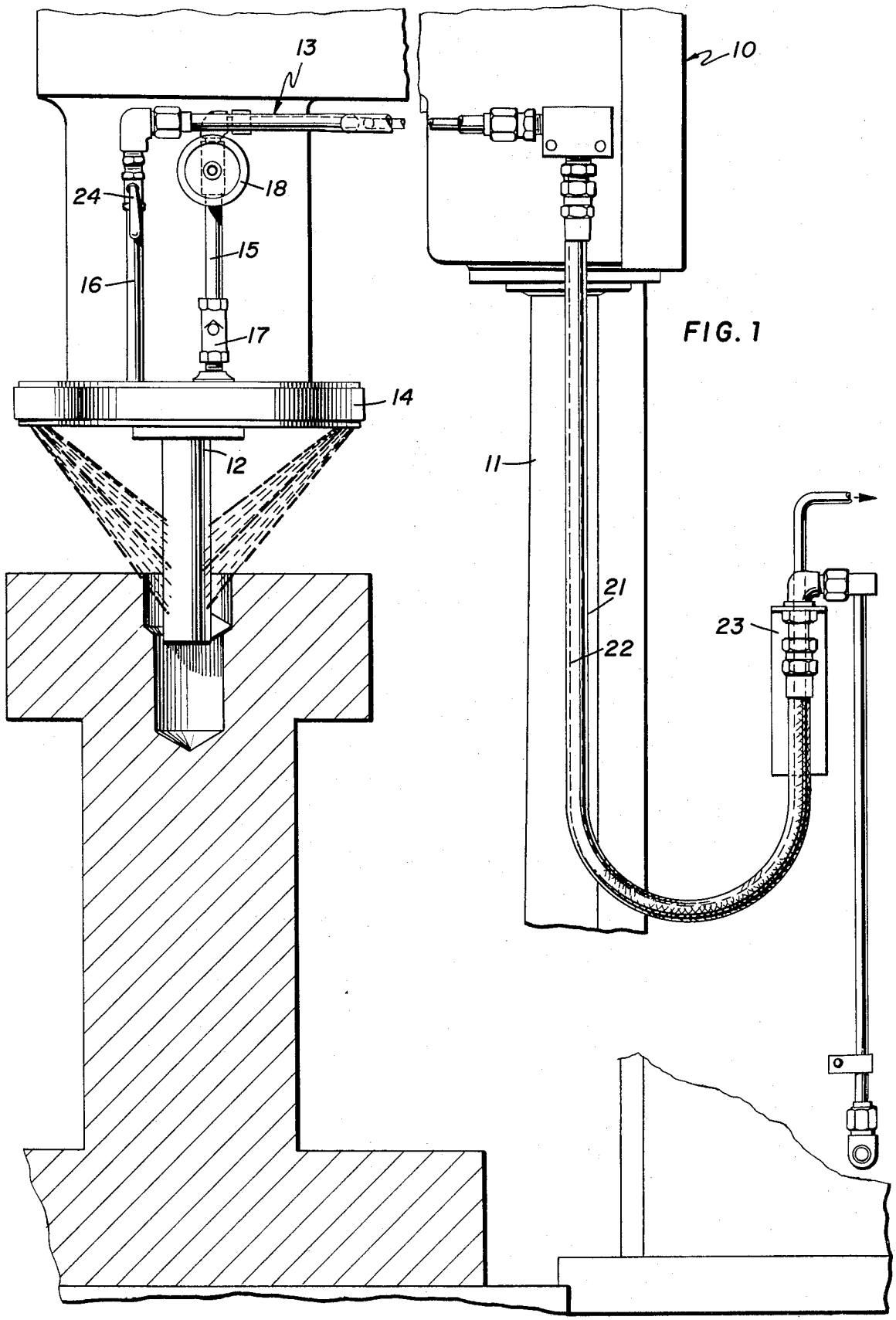
FIG. 1 is a side elevational view of a machine tool incorporating the principle of the present invention.
Figures 2, 3:
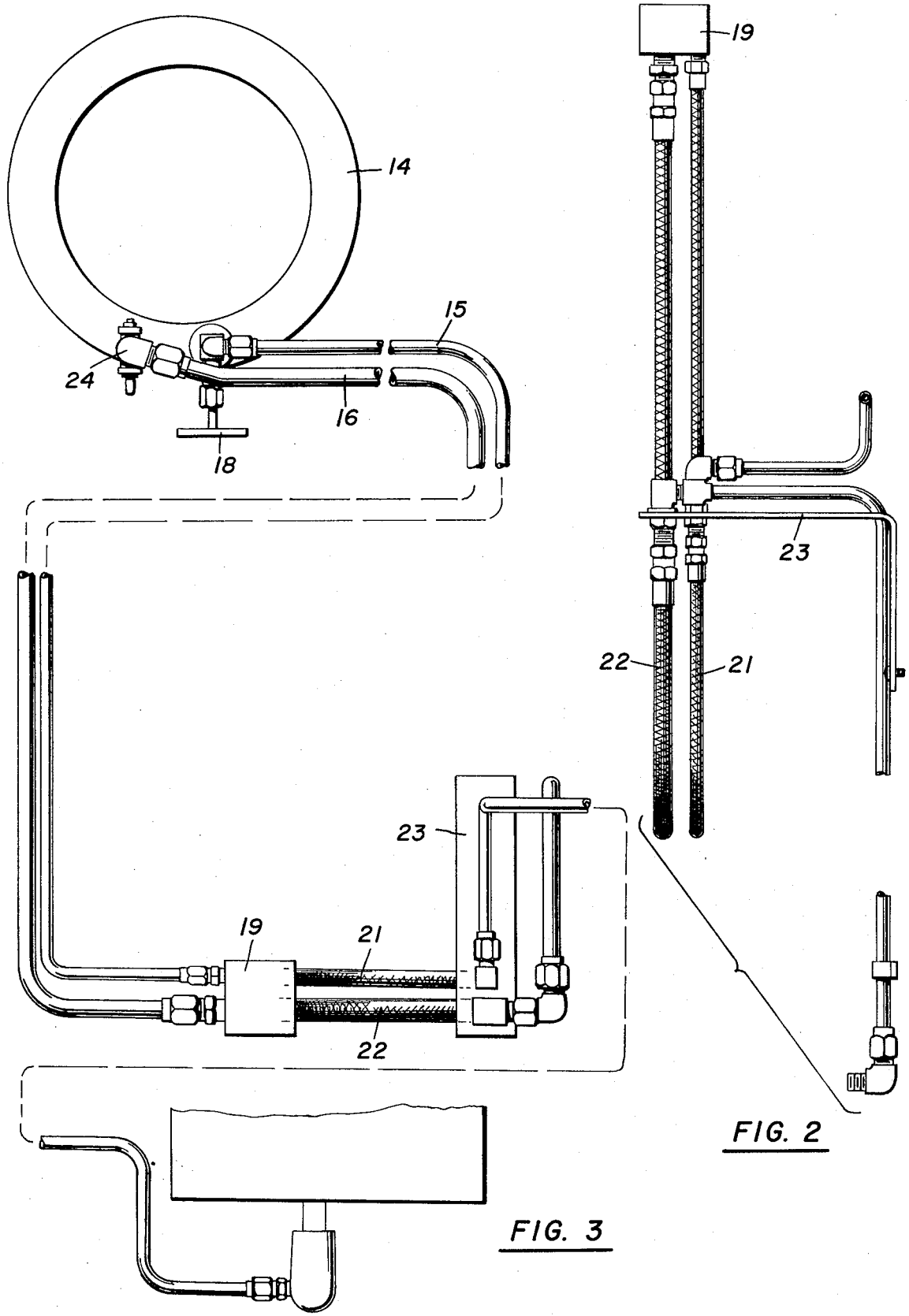
FIG. 2 is a rear elevational view of a coolant system forming part of the machine tool.
FIG. 3 is a plan view of the coolant system.

Referring first to FIG. 1, wherein are best shown the general features of the invention, the machine tool, indicated generally by the reference numeral 10, has a housing 11 in which is mounted a vertical spindle 12. The spindle is adapted to carry a tool for cooperation with a workpiece for the generation of a surface of revolution thereon. A coolant system 13 is mounted on the housing 11, the system forming a general conical pattern of streams of coolant which converge on the vertical axis of the spindle at different levels.

The coolant system includes a hollow ring 14 which is concentric with the vertical axis of the spindle and which is spaced a considerable distance from the outer surface of the spindle. Connected to the ring is a pressure air pipe 15 and a pressure liquid 16 connected, respectively, to sources of these coolant fluids. In the preferred embodiment the pressure air and the liquid are mixed together to form a mist coolant which is applied to the area of the tool and to the workpiece.

A pipe 15 extends along the housing 11 of the machine tool and includes a check valve 17 and a hand-operated ball valve 18. Both pipes 15 and 16 are rigid in construction and arrive at a manifold block 19 where they are connected to flexible hoses 21 and 22 respectively. This allows the upper portion of the housing 11 to move vertically relative to the base of the machine tool without difficulty. Flexible hoses terminate at a mounting plate 23 which is mounted on a fixed part or base of the machine tool. From there the pipes become rigid again and are connected to the suitable usual sources of pressure air and fluid.

Figure 4:
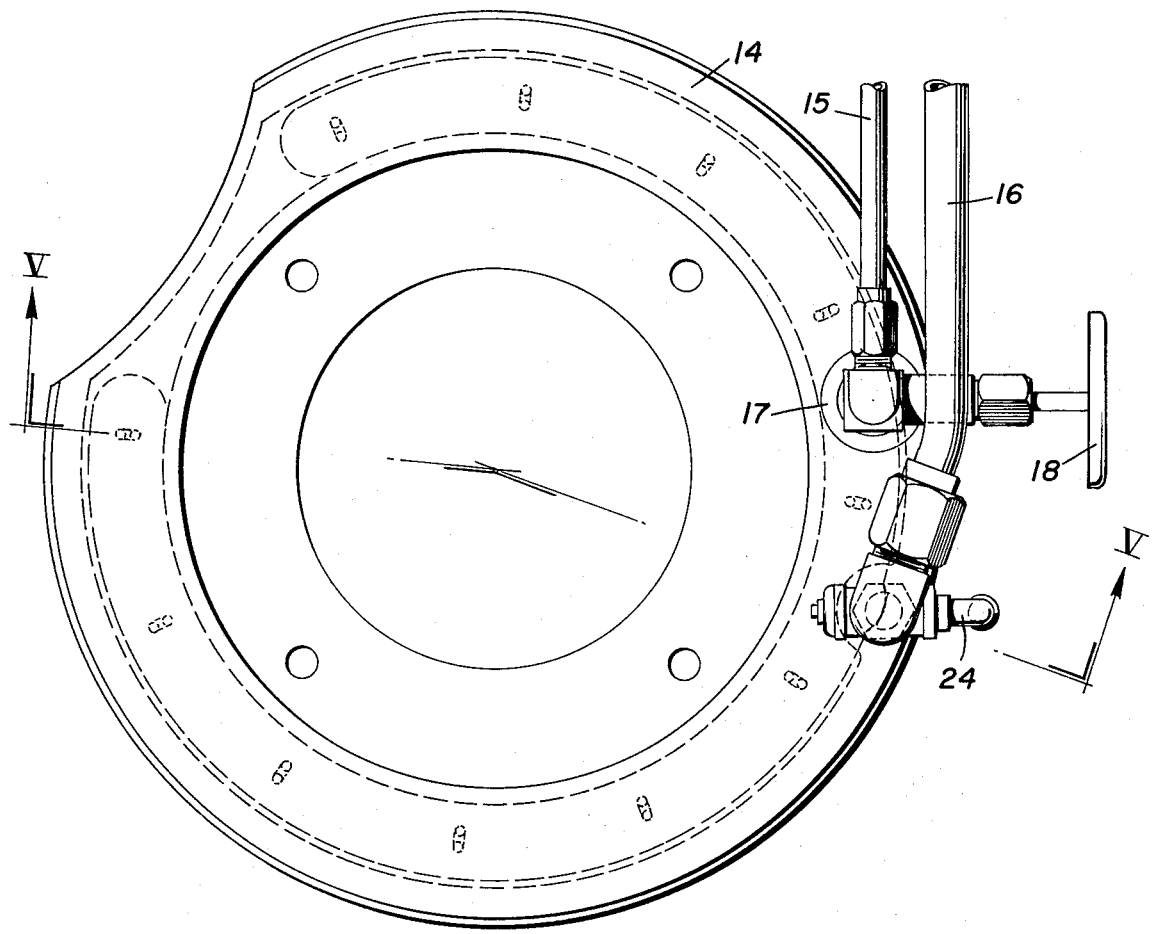
FIG. 4 is a plan view of a ring forming part of the coolant system.
Figure 5:
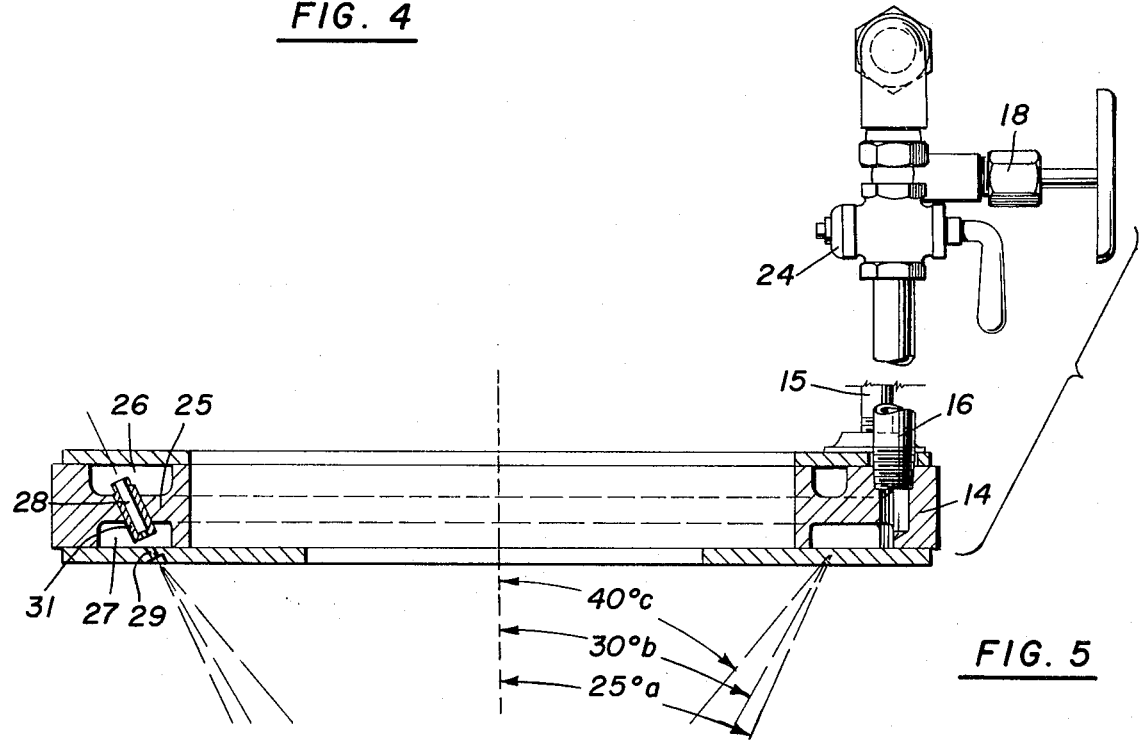
FIG. 5 is a sectional view of the ring taken on the line V—V of FIG. 4.

Referring now to FIGS. 4 and 5, which shows the details of the ring 14, it can be seen that the fluid pipe 16 is provided with a ball valve 24 for entirely cutting off fluid flow to the ring. The ring 14 is hollow and is provided with a radial wall 25 which divides it into two axially-spaced chambers 26 and 27. The wall is provided with primary orifices 28 which connect the air chamber 26 to the fluid chamber 27. The chamber 26 is connected to the air pipe 15, while the lower chamber 27 is provided with liquid from the liquid pipe 16. The bottom wall of the chamber 27 is provided with secondary orifices 29 leading to the exterior of the ring. These orifices are in general alignment with the primary orifices 28 in the wall 25, so that air flows from the chamber 26 through the primary orifices 28 in the wall 25, passes through the liquid coolant in the chamber 27, and leaves in a stream through the secondary orifices 29.

The ring is provided with a plurality of pairs of primary orifices 28 and secondary orifices 29. These are all evenly spaced on an imaginary circle which is concentric to the axis of the spindle 12. The plurality of pairs consists of a plurality of groups, each group extending at the same angle to produce streams in a conical pattern whose included angle is substantial different from that of the other group. In the preferred embodiment, an angle A is an angle to the axis of 25°, an angle B has an angle of 30°, and an angle C has an angle of 40°, so that the coverage of the streams along the length of the axis is quite substantial to take care of an elongated tool mounted on the spindle. In the preferred embodiment, the orifice 28 is formed in a nozzle 31 located in a suitable bore through the wall 25. The nozzle is elongated and extends into the chamber 27 a substantial distance with the outlets end of the orifice located relative closely adjacent to the secondary orifice 29.

The operation of the apparatus will now be readily understood in view of the above description. The spindle 12 is provided with a tool, while a workpiece is mounted on the machine tool. The spindle is rotated in the usual way and is advanced into the workpiece to form a surface of rotation in the usual way. The coolant system 13 is put into operation by opening the valve 18 in the air line 15 and the valve 24 in the fluid line 16. Pressure air fills the upper chamber 26 and causes it to flow through the orifice 28 into the chamber 27. The chamber 27 is full of fluid from the pipe 16 and the air passes downwardly through this fluid into the orifice 29 at the same time picking up a degree of fluid. The streams that emerge from the ring 14, therefore, are a mist-type coolant consisting of a suspension of fluid in a flow of air. This stream engages the tool and the workpiece in the area where work is going on and maintains them cool, lubricated, and free of chips. It is, of course, possible to provide either pure air or pure fluid with this system or to adjust the amount of each. The flexible hoses 21 and 22 permit the movement of the upper part of the machine tool relative to the base. The fact that the ring 14 is well out of the machining area means that it does not interfere with the machining operation or with the set-up procedures.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising:
   a. a housing,
   b. a spindle mounted in the housing for rotation about an axis and adapted to carry a tool, and
   c. a coolant system mounted on the housing, the system forming the coolant into a generally conical pattern of streams of coolant which streams converge on the said axis, wherein the coolant system includes a hollow ring concentric with the said axis and a pipe connected to the ring and to a source of coolant, and wherein the hollow ring is provided with a radial wall which divides the ring into a first and second axially spaced chambers, wherein the wall is provided with primary orifices, wherein the first chamber is provided with air under pressure, wherein the second chamber is provided with liquid coolant, and wherein the second chamber is provided with secondary orifices leading to the exterior of the ring in general alignment with the primary orifices in the said wall, so that air flows from the said first chamber through the primary orifices in the said wall, passes through the liquid coolant in the said second chamber, and leaves in a stream through the secondary orifices.

2. A machine tool as recited in claim 1, wherein the ring is provided with a plurality of pairs of primary and secondary orifices, all evenly spaced on an imaginary circle concentric to the said axis, and wherein the plurality of pairs consist of at least two groups, each pair being configured to send out a stream having a stream axis which forms an angle with the axis, and the angle for each pair in a group is the same, but the angle for each group is different.

3. A machine tool as recited in claim 1, wherein each primary orifice is formed in an elongated nozzle that is mounted in the said wall and extends into the said second chamber a substantial distance with its outlet situated relatively close to the corresponding secondary orifice.

* * * * *